(No Model.)

S. BRADBURY, Jr.
VALVE.

No. 308,461. Patented Nov. 25, 1884.

Witnesses.
John M. Clayton.
James F. Tobin

Inventor.
Samuel Bradbury Jr
by his Attys
Howson & Sons

UNITED STATES PATENT OFFICE.

SAMUEL BRADBURY, JR., OF PHILADELPHIA, PENNSYLVANIA.

VALVE.

SPECIFICATION forming part of Letters Patent No. 308,461, dated November 25, 1884.

Application filed March 15, 1884. (No model.)

*To all whom it may concern:*

Be it known that I, SAMUEL BRADBURY, Jr., a citizen of the United States, and a resident of Philadelphia, Pennsylvania, have invented certain Improvements in Valves, of which the following is a specification.

My invention relates to that class of valves in which the screw-nut can be released from the casing in order to permit it to turn with the stem, and thus effect the regrinding of the valve to its seat without disturbing the valve-casing, the objects of my improvements being to permit the nut to be readily secured to or released from the casing, to utilize said nut for locking the valve to the stem when a swiveled valve is used, and to provide for the rapid and continuous rotation of the valve-stem during the regrinding operation.

Figure 1:
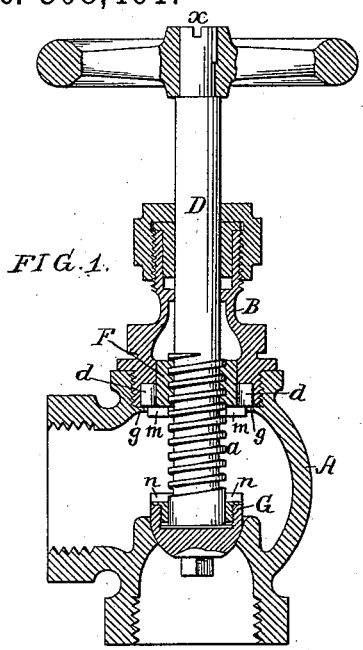
Figure 2:
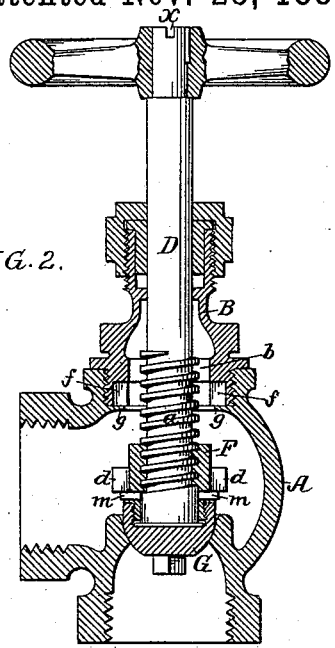
Figure 3:
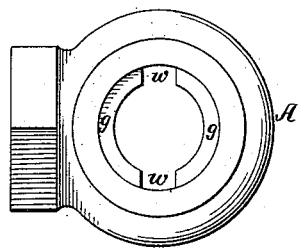
Figure 4:
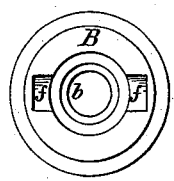
Figure 5:
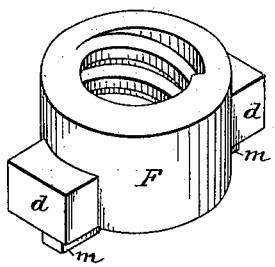
Figure 6:
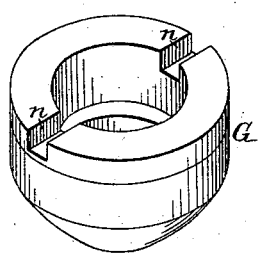

In the accompanying drawings, Figure 1 is a vertical section of a valve with my improvements, the parts being in their ordinary working position; Fig. 2, the same, showing the parts adjusted so as to permit the regrinding of the valve to its seat; Fig. 3, a plan view of the valve-casing with the cap removed; Fig. 4, an inverted plan view of said cap; Fig. 5, an enlarged perspective view of the nut for the valve-stem; and Fig. 6, a perspective view of the valve removed from the stem, and also on an enlarged scale.

A is the casing of the valve, which in the present instance has the inlet and discharge branches at right angles to each other; but it should be understood that my invention can be applied to a straight-way valve as well.

B is the detachable screw-cap, which has the usual stuffing-box for the valve-stem D, the latter having a threaded portion, *a*, for adaptation to the nut F, and being furnished in the present instance with a swiveled valve, G, comprising a ring and cap, screwed together and embracing a flange at the lower end of the valve-stem. The nut F is adapted to a central opening, *b*, in the cap B, and has lugs *d*, which enter recesses *f* in said cap, and bear upon a flange, *g*, in the top of the casing A, so that the nut is prevented from either turning or moving vertically when the cap has been screwed to its place. On the under side of the nut are lugs *m*, and in the top of the valve G are recesses *n* for the reception of these lugs.

When it is desired to regrind the valve, the cap B is first unscrewed, and, with the valve-stem and valve, removed from the casing. The nut F is then screwed down on the stem and the lugs *m* caused to enter the recesses *n* of the valve, so as to lock the latter to the stem. Emery is applied to the valve-seat, and the valve and stem are then reintroduced into the casing, the lugs *d* of the nut F passing through notches *w* in the flange *g* of the casing, Fig. 3. The cap B is then reapplied, so as to form an upper bearing for the valve-stem, by the rotation of which the valve is ground to its seat. In order to facilitate this rotation the upper end of the valve-stem has a notch, *x*, for the reception of a bit carried by a brace, so that the rotation of the valve-stem in either direction may be effected with rapidity, and the desired grinding of the valve thus accomplished in a very short time.

Single lugs *d* and *m* on the nut, single recesses in the cap, and a single notch, *w*, in the flange *g* may in some cases be used instead of the duplicate arrangement shown, but the latter is preferred.

I claim as my invention—

1. The combination of the casing A, having a flange, *g*, with notch *w*, the cap B, having a recess, *f*, and the nut F, having a lug, *d*, as set forth.

2. The combination of the valve-stem having a swiveled valve, G, with recess *n*, the nut F, having a lug, *m*, for adaptation to said recess, and means for locking said nut to and releasing it from the valve-casing, as set forth.

3. The combination of the casing having a notched flange, the valve, the valve-stem having an end slot, *x*, the nut F, having a lug, *d*, and the cap B, having a recess for the reception of said lug, as set forth.

In testimony whereof I have signed my name to this specification in the presence of two subscribing witnesses.

SAML. BRADBURY, JR.

Witnesses:
 JOHN M. CLAYTON,
 HARRY SMITH.